(12) United States Patent
Yoda

(10) Patent No.: US 6,830,292 B1
(45) Date of Patent: Dec. 14, 2004

(54) TABLE FOR A MOTOR VEHICLE SEAT

(76) Inventor: Mitsuhiro Yoda, 976-3, Togami, Fujinomiya-shi, Shizuoka-ken (JP)

( * ) Notice: Subject to any disclaimer, the term of this patent is extended or adjusted under 35 U.S.C. 154(b) by 0 days.

(21) Appl. No.: 10/753,271

(22) Filed: Jan. 9, 2004

(51) Int. Cl.$^7$ .............................................. A47B 23/00
(52) U.S. Cl. ................. 297/188.06; 297/146; 297/163; 297/169; 297/188.05; 108/44
(58) Field of Search ................................ 297/146, 163, 297/169, 174 R, 411.25, 411.38, 188.05, 188.06; 108/44, 48, 134, 135, 152; 224/275, 926

(56) References Cited

U.S. PATENT DOCUMENTS

| | | | | |
|---|---|---|---|---|
| 2,687,336 A | * | 8/1954 | Smith et al. | 297/163 |
| 2,798,780 A | * | 7/1957 | Motorney | 297/163 |
| 2,881,039 A | * | 4/1959 | Guzman | 297/163 |
| 3,050,355 A | * | 8/1962 | Hess et al. | 297/163 |
| 5,046,433 A | * | 9/1991 | Kramer et al. | 108/44 |
| 5,269,229 A | * | 12/1993 | Akapatangkul | 108/44 |
| D344,625 S | * | 3/1994 | Berry | D12/416 |
| 5,511,493 A | * | 4/1996 | Kanehl, Jr. | 108/44 |
| 6,279,800 B1 | * | 8/2001 | Lee | 224/276 |

* cited by examiner

Primary Examiner—Peter R. Brown
(74) Attorney, Agent, or Firm—Harrison & Egbert

(57) ABSTRACT

A table supporting device is provided at an upper end thereof with a loop. The loop is hung on the headrest of the motor vehicle seat so that the table supporting device is positioned substantially vertically. The loop 9 is removable from the headrest. A plate-shaped table has a table holding mechanism. The table holding mechanism holds the table vertically rotatably by means of a horizontal shaft. The table holding mechanism is provided with a vertical hole. The vertical hole has a larger diameter than the table supporting device. The table supporting device is passed through the vertical hole of the table holding mechanism. A vertical bolt is threadedly engaged with the table holding mechanism. A lower end of the vertical bolt is in contact with a base portion of the table so as to maintain the table at a desired angle.

4 Claims, 4 Drawing Sheets

TABLE FOR A MOTOR VEHICLE SEAT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a table for a motor vehicle seat. More particularly, the invention relates to a table for a motor vehicle seat, which can be attached to a seat of a motor vehicle at an adjustable height and an adjustable angle in relation to the seat. The table for a motor vehicle seat according to the present invention is used, for example, for writing, reading, eating and using a computer in a motor vehicle.

BACKGROUND OF THE INVENTION

Various tables for a motor vehicle seat are known. These tables comprise a plate-shaped table attached to the back of a motor vehicle seat by attaching means or supporting means.

However, in the prior art tables, the means for attaching the table to the back of a motor vehicle seat and the means for supporting the table on the back of a motor vehicle seat are complicated and expensive. Furthermore, in the prior art tables, it is difficult to attach the table to the back of a motor vehicle seat and detach the table therefrom.

It is an object of the invention to obviate all of the above-mentioned disadvantages of the prior art.

It is another object of the invention to provide a table for a motor vehicle seat, which is simpler and less expensive than prior art tables.

It is a further object of the invention to provide a table for a motor vehicle seat, which can be easily attached to a motor vehicle seat and easily detached therefrom.

These and other objects have been achieved by the following table for a motor vehicle seat.

BRIEF SUMMARY OF THE INVENTION

First, the present invention is a table for a motor vehicle seat comprising a table supporting means, said table supporting means being provided at an upper end thereof with a loop, said loop being hung on a headrest of a motor vehicle seat so that said table supporting means is positioned substantially vertically, said loop being removable from said headrest, a table having a table holding means, said table holding means holding said table vertically rotatably by means of a horizontal shaft, said table holding means being provided with a vertical hole, said vertical hole having a larger diameter than said table supporting means, said table supporting means being passed through said vertical hole of said table holding means, a vertical bolt being threadedly engaged with said table holding means, a lower end of said vertical bolt being in contact with a base portion of said table so as to maintain said table at a desired angle.

In this embodiment, the table for a motor vehicle seat can be easily attached to a motor vehicle seat and easily detached therefrom because the table supporting means is provided at an upper end thereof with a loop which can be removably hung on a headrest of a motor vehicle seat.

The table for a motor vehicle seat is simpler and less expensive than prior art tables.

The table holding means is usually inclined in relation to the table supporting means by the weight of the table itself and the weight of a thing put on the table. This means that a lower end on a side near the table (See reference symbol "a" in FIGS. 4 and 5.) and an upper end on an opposite side (See reference symbol "b" in FIGS. 4 and 5.) of the vertical hole of the table holding means are pressed against the table supporting means. Therefore, the height of the table holding means is fixed in relation to the table supporting means. As a result, the height of the table attached to the table holding means is also fixed.

The height of the table can be adjusted by slightly lifting the table by hand so that the vertical hole of the table holding means is substantially parallel to the table supporting means and moving the table and the table holding means upwardly or downwardly to a desired position. When the table is set free, the table holding means is inclined again in relation to the table supporting means by the weight of the table, and the height of the table is fixed.

The base portion of the table has a tendency to be turned upwardly by the weight of the table itself and the weight of a thing put on the table. However, the table is fixed at a desired angle, without being turned, because the lower end of the vertical bolt, which is threadedly engaged with the table holding means, is kept in contact with the base portion of the table.

The angle of the table can be adjusted by rotating the vertical bolt, which is threadedly engaged with the table holding means, to change the height of the lower end of the vertical bolt. The table is fixed at the desired angle because the lower end of the vertical bolt is in contact with the base portion of the table.

Second, in the table for a motor vehicle seat described above, said table supporting means is provided with two parallel members, said table having two said table holding means, each of said parallel members being passed through each vertical hole of said table holding means.

In this embodiment, the table is very stable because the two table holding means are supported respectively by the two parallel members.

Third, in the table for a motor vehicle seat described above, said table supporting means is attachable to any of a front surface and a rear surface of a back of a motor vehicle seat.

When the table supporting means is attached to a front surface of the back of a front seat in a motor vehicle, the table is positioned in front of the front seat, and the table is used in a front seat beside said front seat. See FIG. 1. When the table supporting means is attached to a front surface of the back of a rear seat in a motor vehicle, the table is positioned in front of the rear seat, and the table is used in a front seat. See FIG. 1. When the table supporting means is attached to a rear surface of the back of a front seat in a motor vehicle, the table is positioned at the rear of the front seat, and the table is used in a rear seat. See FIG. 2.

DETAILED DESCRIPTION OF THE INVENTION

Figure 1:
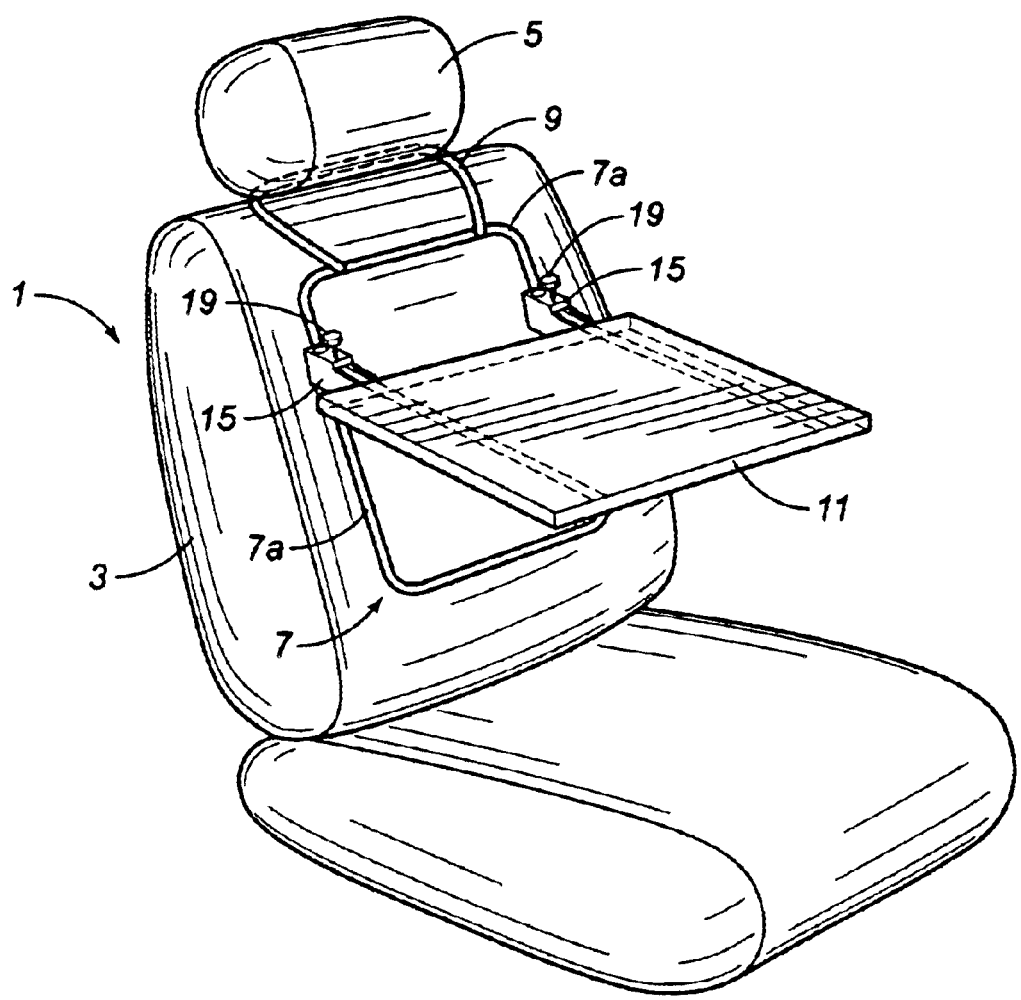
FIG. 1 is a perspective view showing a table attached to a front surface of the back of a front seat in a motor vehicle.
Figure 2:
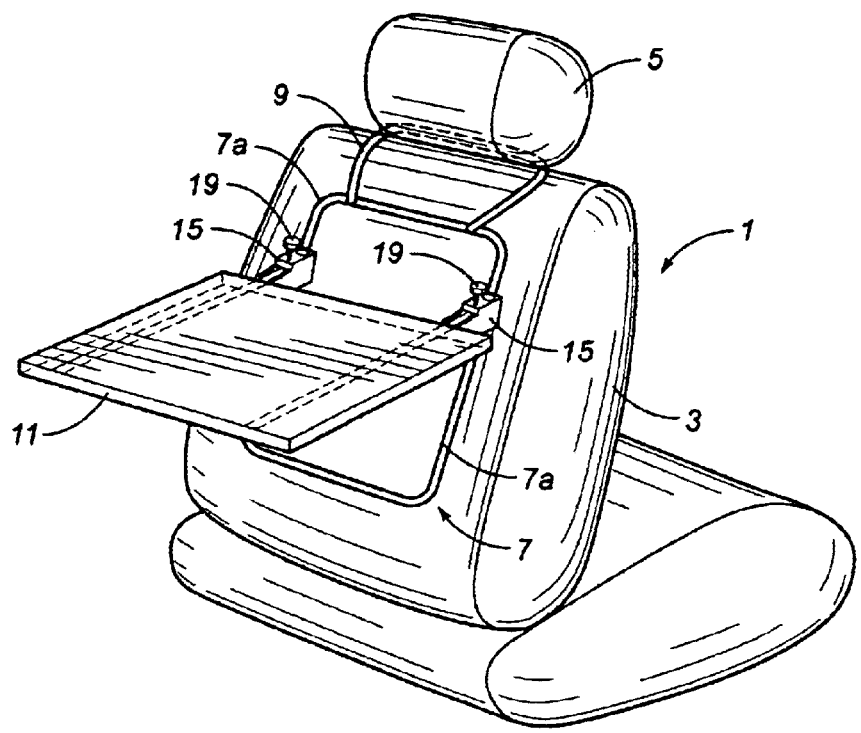
FIG. 2 is perspective view showing a table attached to a rear surface of the back of a front seat in a motor vehicle.
Figure 3:
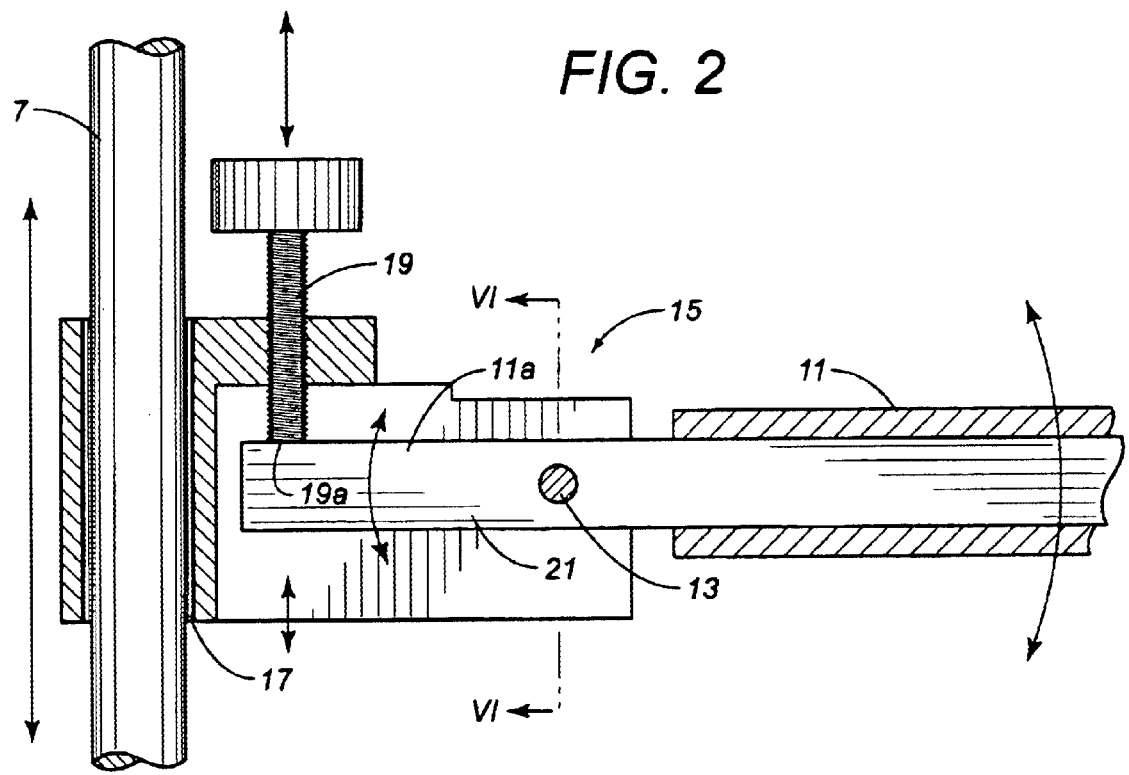
FIG. 3 is a sectional view showing a table, a table supporting means and a table holding means when the table is at a certain angle.
Figure 4:
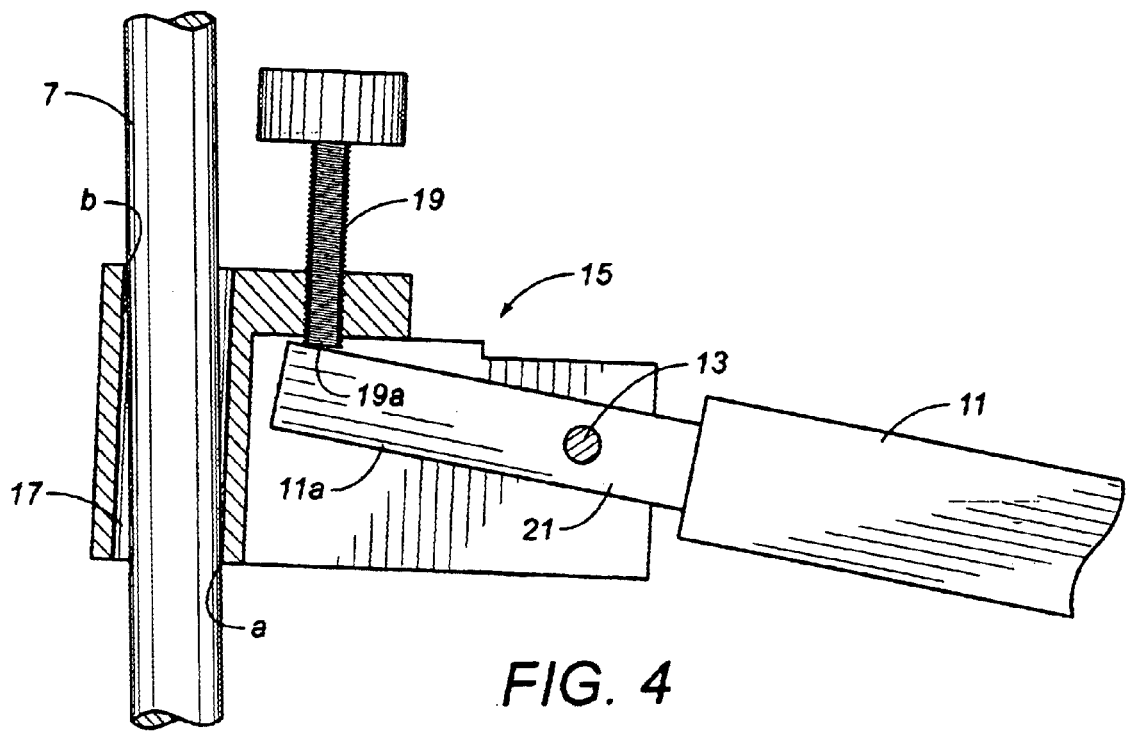
FIG. 4 a sectional view showing a table, a table supporting means and a table holding means when the table is at a different angle.
Figure 5:
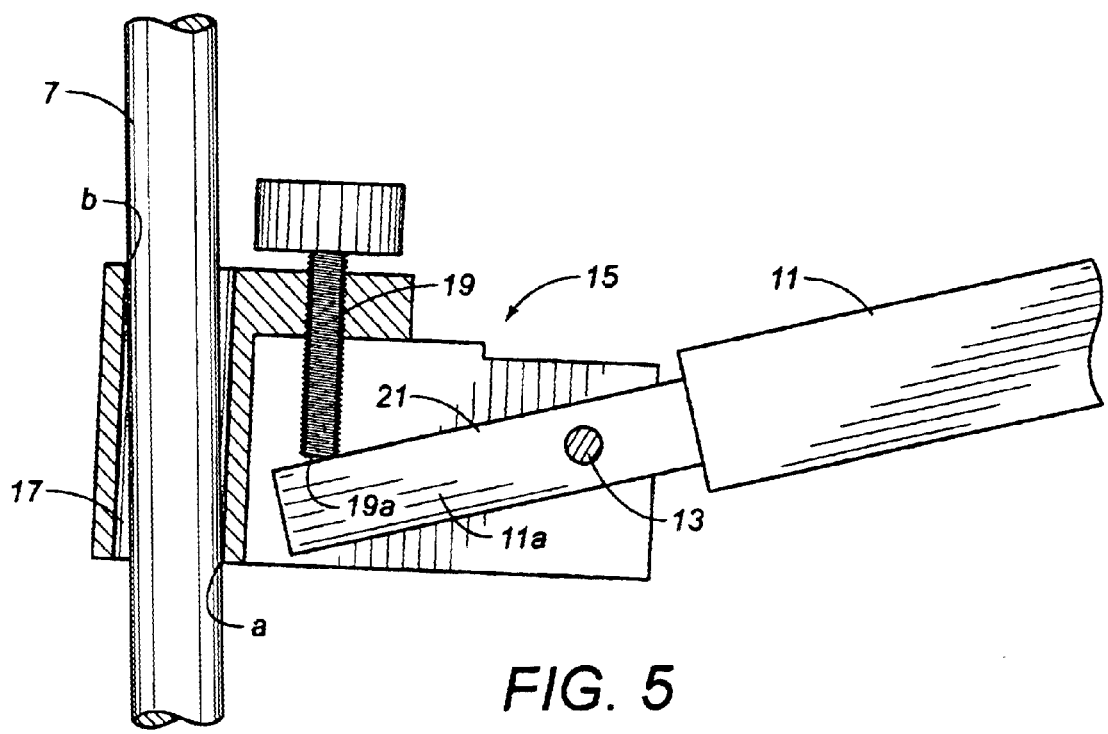
FIG. 5 is a sectional view showing a table, a table supporting means and a table holding means when the table is at a further different angle.
Figure 6:
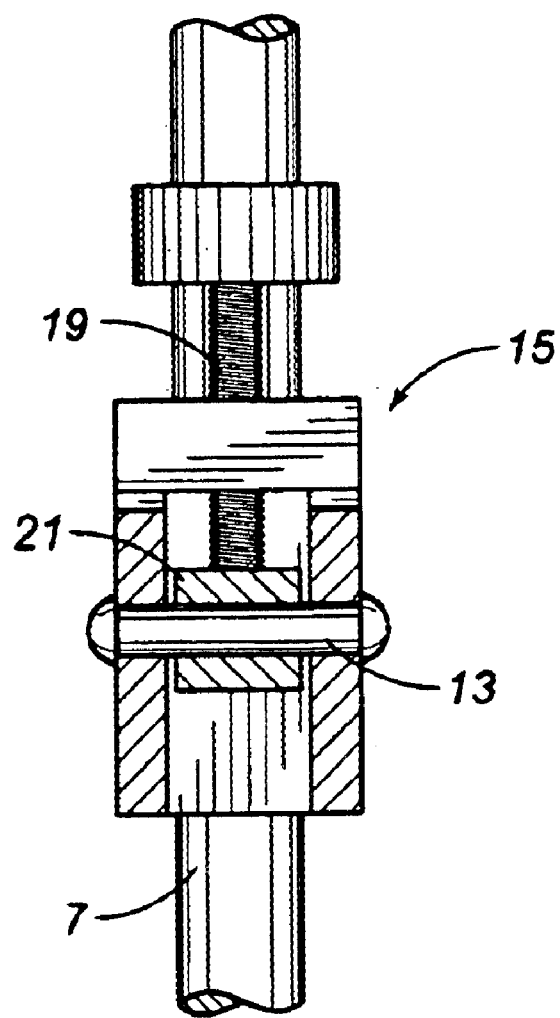
FIG. 6 is a sectional view taken along line VI—VI of FIG. 3.

The invention will now be described in detail with reference to the attached drawings.

Reference symbol 1 represents a motor vehicle seat. Reference symbol 3 represents a back of the motor vehicle seat 1. Reference symbol 5 represents a headrest of the motor vehicle seat 1.

A table supporting means 7 is provided at an upper end thereof with a loop 9. The loop 9 is hung on the headrest 5 of the motor vehicle seat 1 so that the table supporting means 7 is positioned substantially vertically. The loop 9 is removable from the headrest 5.

A plate-shaped table 11 has a table holding means 15. The table holding means 15 holds the table 11 vertically rotatably by means of a horizontal shaft 13.

The table holding means 15 is provided with a vertical hole 17. The vertical hole 17 has a larger diameter than the table supporting means 7. The table supporting means 7 is passed through the vertical hole 17 of the table holding means 15.

A vertical bolt 19 is threadedly engaged with the table holding means 15. A lower end 19a of the vertical bolt 19 is in contact with a base portion 11a of the table 11 so as to maintain the table 11 at a desired angle.

In a preferable embodiment, the table supporting means 7 is provided with two parallel members 7a, 7a, the table 11 having two said table holding means 15, each of said parallel members 7a, 7a being passed through vertical hole 17 of the table holding means 15. The table 11 is provided with two projections 21, 21 each forming said base portion 11a.

The table supporting means 7 is attachable to any of a front surface and a rear surface of the back 3 of a motor vehicle seat 1.

As many apparently widely different embodiments of the present invention may be made without departing from the spirit and scope thereof, it is to be understood that the invention is not limited to the specific embodiments thereof except as defined in the appended claims.

I claim:

1. A table for a motor vehicle seat comprising:
   a table supporting means, being provided at an upper end thereof with a loop, said loop being hung on a headrest of a motor vehicle seat so that said table supporting means is positioned substantially vertically, said loop being removable from said headrest; and
   a table having a table holding means, said table holding means holding said table vertically rotatably by means of a horizontal shaft, said table holding means being provided with a vertical hole, said vertical hole having a larger diameter than said table supporting means, said table supporting means being passed through said vertical hole of said table holding means, a vertical bolt being threadedly engaged with said table holding means, a lower end of said vertical bolt being in contact with a base portion of said table so as to maintain said table at a desired angle.

2. A table for a motor vehicle seat as claimed in claim 1, wherein said table supporting means is comprised of two parallel members, said table having two of said table holding means, each of said parallel members being passed through each vertical hole of said table holding means.

3. A table for a motor vehicle seat as claimed in claim 2, wherein said table supporting means is attachable to any of a front surface and a rear surface of a back of a motor vehicle seat.

4. A table for a motor vehicle seat as claimed in claim 1, wherein said table supporting means is attachable to any of a front surface and a rear surface of a back of a motor vehicle seat.

* * * * *